United States Patent [19]

Landa et al.

[11] Patent Number: 5,569,630
[45] Date of Patent: Oct. 29, 1996

[54] COMPOSITES FOR GLASS

[76] Inventors: Leonid Landa, 218 S. Fifth St.; Ksenia Landa, 218 S. Fifth St., both of Jeannette, Pa.

[21] Appl. No.: 406,984

[22] PCT Filed: Oct. 4, 1993

[86] PCT No.: PCT/US93/09260

§ 371 Date: Apr. 4, 1995

§ 102(e) Date: Apr. 4, 1995

[87] PCT Pub. No.: WO94/07805

PCT Pub. Date: Apr. 14, 1994

[30] Foreign Application Priority Data

Oct. 4, 1992 [IL] Israel ........................................ 103372

[51] Int. Cl.$^6$ .................................................. C03C 3/095
[52] U.S. Cl. ................................. 501/64; 501/905; 65/32.5
[58] Field of Search .................... 501/64, 905; 165/32.1, 165/32.5

[56] References Cited

U.S. PATENT DOCUMENTS

| | | |
|---|---|---|
| 3,499,775 | 3/1970 | Albinak et al. |
| 4,566,987 | 1/1986 | Glemeroth et al. ............... 252/301.4 F |
| 4,684,497 | 8/1987 | Chubb ..................................... 376/419 |
| 4,786,619 | 11/1988 | Gerrard et al. ............................ 501/64 |
| 4,859,637 | 8/1989 | Roberts ..................................... 501/79 |
| 5,219,801 | 6/1993 | Shorrock et al. .......................... 501/65 |

FOREIGN PATENT DOCUMENTS

| | | |
|---|---|---|
| 0150708 | 8/1985 | European Pat. Off. |
| 0321297 | 6/1989 | European Pat. Off. |
| 0486352 | 5/1992 | European Pat. Off. |
| 0505061 | 9/1992 | European Pat. Off. |
| 0720075 | 2/1932 | France. |
| 2121784 | 1/1984 | United Kingdom. |

*Primary Examiner*—Karl Group
*Attorney, Agent, or Firm*—Dennison, Meserole, Pollack & Scheiner

[57] ABSTRACT

A lithium-free glass composition containing 64 to 75% $SiO_2$, 11 to 16% total of a matrix compound selected from a first group which is $B_2O_3$, and BaO, or from a second group which contains $Al_2O_3$, MgO, CaO and ZnO, above 10% $Na_2O$ as a modifier, 0 to 7% $K_2O$ as a modifier, and 0.1 to 15% $Ce_2O_3$ as a dopant. When the matrix compound is a member of the group $B_2O_3$ and BaO, MgO, CaO and ZnO can be present in an amount of 0 to 5% as an additional modifier. The glass of the invention has the properties of high transmittance of radiation of wavelength greater than 370 mµ, substantially complete absorbance of radiation of wavelength below 350 mµ, and detection of ultraviolet and ionizing radiation with a decay of luminescence of below 45 nanoseconds.

16 Claims, 4 Drawing Sheets

COMPOSITES FOR GLASS

BACKGROUND OF THE INVENTION

The present invention relates to novel glass compositions which possess various improved properties, including complete absorbance of harmful ultraviolet rays.

Most of the glasses manufactured today are based on three main constituents: silica, alkali metal oxide and oxides of metals belonging to Group II of the Periodic Table (calcium, magnesium, zinc). Silica in its fused state, is an excellent glass but, as the melting point of crystalline silica (i.e. sand) is above 1700° C. and forms glass above 2200° C., its production is very expensive so that its uses are restricted to a specific limited purposes. In order to reduce the melting point of silica, it is necessary to add a flux, such as sodium carbonate which provides the sodium oxide constituent. Thus, by adding about 25% of sodium oxide to silica, the melting point is reduced from 1723° C. to 850° C. and the glass forming temperature to 1400° C. However, such glasses are easily soluble in water. The addition of a third constituent such as calcium oxide, magnesium oxide or zinc oxide, renders the glass insoluble, but too much of this third constituent renders the glass prone to devitrification, i.e. the precipitation of crystalline phases in certain ranges of temperature.

The optimum composition for glass which was considered to be useful for many purposes included 75% silica, 15% alkali oxide and 10% oxides of a metal from Group II. Of course, in addition to these main constituents, other materials are also incorporated in order to impart a specific property; for example, by adding small amounts of cobalt oxide together with traces of arsenic trioxide and sodium nitrate, the green color imparted by the iron impurity, generally present in sand, is substantially eliminated. Glasses of very different compositions are suggested when special physical and chemical properties are required. Among the properties which are particularly important for glass, the following can be mentioned: electrical properties including conductivity and dielectric constant, optical properties and ultraviolet ray transmission.

The electrical conductivity of glass varies with the composition and the temperature used in its manufacture. In most glasses, the current is carried by alkali metal ions moving through the material, but semiconducting glasses have recently been discovered in which the current is carried by electrons.

New uses for glass arise continuously, as also do new developments in the glasses themselves. In 1965, a glass was developed for use in the laser, possessing the property of light amplification by stimulated emission of radiation. In the laser device, it is necessary to have certain ions in surroundings that will permit them to be excited by incident light; the ions will be excited by incident light and will emit radiation of longer wavelength through the process known as fluorescence. When certain critical conditions associated with the electronic processes of the ions are accomplished, it is possible to produce in this way very intense and highly homogeneous beams of light. A glass containing about 5% of neodymium has been found to be suitable for some of these applications.

Scintillating glasses and fibers have been developed in the last twenty years as new materials for electromagnetic calorimetry as well as for tracking applications in high energy physics. Thus, a new glass composition, which is based on a cerium-doped lithium-aluminum-magnesium-silicate, was described by Atkinson et al (Nuclear Instr. Methods in Phys. Res. A 254, 500–514, 1987). It is mentioned that such glasses have a maximum absorption at 320 nm, an energy conversion coefficient of 0.55% which is equivalent to 2.1 photons/$Kev_1$, refractive index of 1.46 and a fast decay time of about 100 nanoseconds. The main drawbacks of these scintillating glass fibres are: long decay time, low light yield in the range of 0.2 to 0.5, which is much below of that obtained today with various plastic materials and short radiation length of about 9.3 cm compared to 42 cm obtained with some plastic materials.

In another paper (U. Buchner et al, Nuclear Inst. and Methods in Phys. Res. A272, 695–706, 1988), a new scintillating glass electromagnetic calorimeter was described. The composition contained as main components, 44.2% BaO, 42% silica and 1.6% $Ce_2O_3$ as a scintillating component. The decay constant for this glass is mentioned to be 87+5 nanoseconds.

According to a German patent No. 3,920,447, a scintillation element for a fibre-optic ionizing radiation detector consists of 5 to 1000 cm long fibres of $Ce^{+3}$-doped quartz glass containing at least 95% $SiO_2$. It is claimed that this quartz glass has a decay time of about 80 to 90 nanoseconds.

In a review by C. Angelini et.al. (Nuclear Instruments and Methods in Physics Research A281,50-4,1989) the decay time of light emission from cerium-doped scintillation glass is discussed. The requirement of high energy physics experiments for precise tracking detectors combined with the advances of optoelectronic technology have stimulated research for development and use of scintillating fibre detectors with a decay time of much below the usual encountered of 50 nanoseconds.

Another important use of glass which has started to be developed in the last fifteen years, is for solar greenhouses shielding ultraviolet light having a wavelength below 340 mµ, but transparent for useful UV of 370–390 mµ. It was reported that light below this wavelength imparted propagation of various molds causing plant diseases. The standard method of preventing transmission was to attach to the glass using an adhesive, a light-transmitting plastic film, such as polyethylene or polypropylene, which is UV-stabilized, to the inward facing of a glass panel. It is claimed that such panels have improved thermal insulation and thus are saving energy required for heating the greenhouse as well as an improved control of condensation on the panels.

According to the U.K. patent No. 2,093,899, two sheets of glass are suggested for glazing a greenhouse. The characteristic feature for obtaining the desired results is that one of the sheets has a bend which defines an air space between the sheets.

A report on materials for luminescent greenhouse solar collectors is given by Levitt et al (C.A. 88, 155711y). Collectors were made from Neodium-doped laser glass and Rhodamine (a doped plastic). As pointed out, although the results obtained are encouraging, they indicate a need for further spectral sensitization and for reduced matrix-loss coefficient.

In U.S. Pat. No. 5,039,631, glass compositions are disclosed possessing a chemically strengthened surface layer being useful as optical glass that absorbs electromagnetic radiation in the ultra-violet, visible and/or infrared regions of the electro-magnetic spectrum. A characteristic feature of these compositions is the presence of a high content of lanthanide oxide. The strengthenability of the glasses produced is explained by the presence of zinc oxide and sodium oxide and the absence of potassium oxide. The presence of the lanthanide in amounts above 7% is mentioned to be a disadvantage due to the occurrence of unacceptable devitrification. Another constituent mentioned in this patent to be required as a fluxing agent is boron oxide in amount of between 5% to 17% (on a molar basis). Below 5% the meltability property is poor while above 17% phase separation and devitrification occur.

The above brief review clearly indicates the long felt need for novel glass compositions possessing improved properties for the demand of the high-technologies which have been developed in the last few years.

SUMMARY OF THE INVENTION

It is the object of the present invention to provide novel glass compositions having specific improved properties useful for a variety of purposes.

In order to achieve these and other objects, the invention relates to Li-free glass compositions which comprise compounds selected from the following three main groups (in wt percent):

(a) main components:
$SiO_2$ in the range of 64 to 75%, together with:
$B_2O_3$+BaO in the range of 11% to 16% or
$Al_2O_3$+ZnO+MgO+CaO in the range of 11 to 16%;
(b) modifier components:
MgO+CaO+ZnO in the range of 0 to 15%;
$K_2O$ in the range of 0 to 7%; and
$Na_2O$ above 10%; and
(c) doping component:
cerium oxide in the range of 0.01 to 15%.

One of the characteristic features of the invention is the presence of cerium in its reduced form.

Glasses produced from the above compositions are generally colorless, and have the following advantages:

complete absorbance of harmful UV rays, wavelength below 350 mμ;

detection of ultraviolet and ionizing radiation with a decay time of luminescence of below 45 nanoseconds;

high transmittance of the visible spectrum and radiation with wavelength above 370 mμ;

high transparency in the region of cerium luminescence; and non-crystallization on optical fibers during their manufacture.

DETAILED DESCRIPTION OF THE INVENTION

Figure 1:
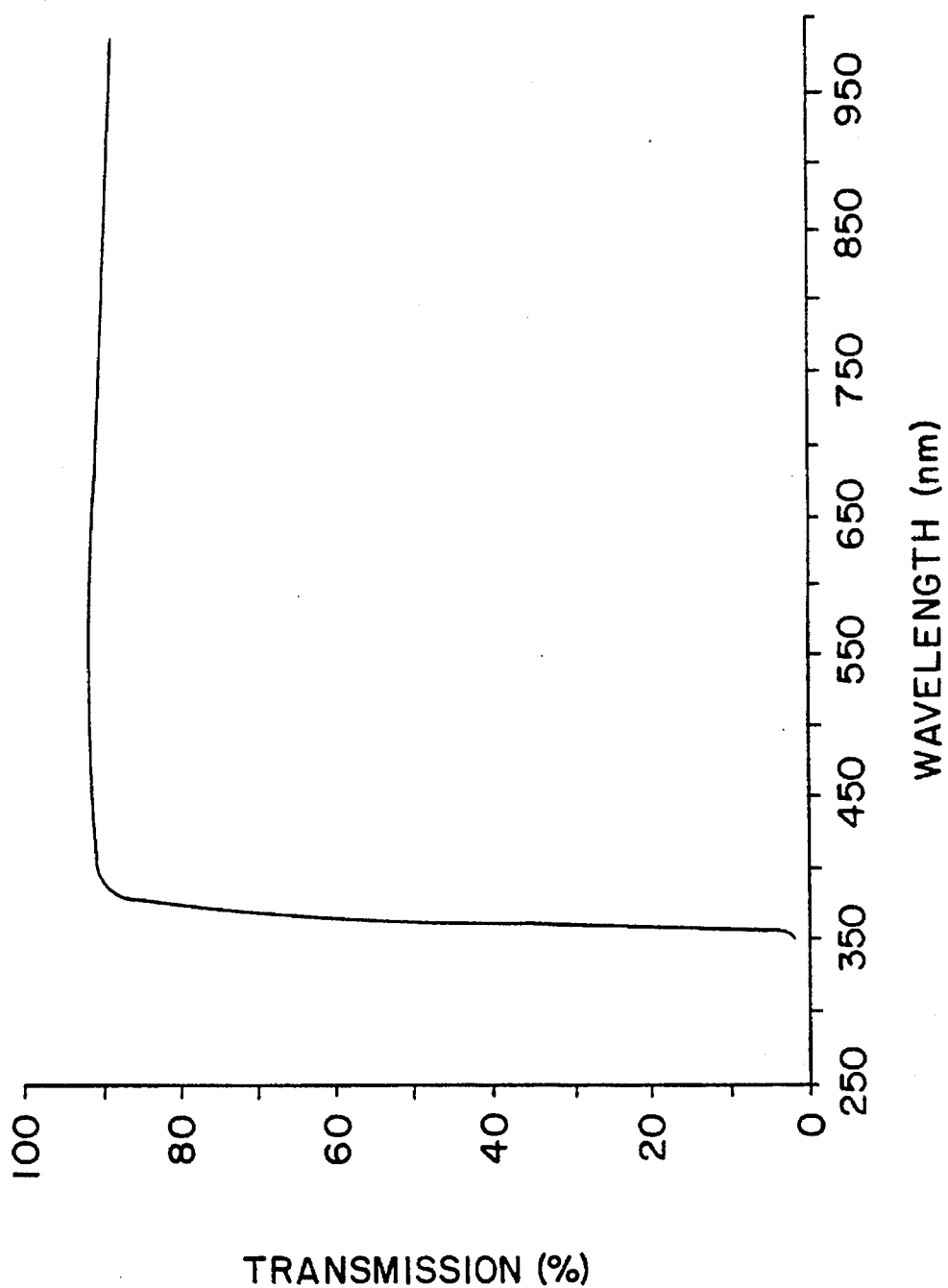
FIG. 1 is a graph of transmittance of a glass sample prepared according to the present invention vs. wavelength.

The invention relates to novel glass compositions comprising the following main matrices, each containing cerium in the form of reduced cerium as a doping constituent. It was surprisingly found that only the reduced form of cerium present in the range of 0.01% to 15% by weight in the matrices of the invention imparts the above mentioned beneficial properties.

As is well known, the absorption and luminescence spectra of a glass usually change with the valency state of dopant ions in the glass. Such ions have 3d or 4f electron configurations, and most have variable valences and exist in the form of two or more ionic valency states in the glass.

If the valence of a metal which is prone to change is introduced into a glass batch, the ratio of the oxidized ion concentration to the reduced ion concentration varies with the composition, the melting temeprature, the melting time, the melting pressure and atmosphere and with any redox agent in the batch, and with the heat-treatment of the solid glass.

In the case of cerium, a reversible reaction can take place between ceric and cerous ions:

Since the 4f configuration of ceric ions have no emissions, the intensity of the fluorescence based on cerium depends on the presence of cerium in the reduced form, i.e. cerous ions.

Accordingly, the glass of the invention includes a transparent matrix with UV-absorbing cerious ions. The glass is obtained by admixing the desired components followed by conventional melting in an appropriate crucible, e.g. aluminum, quartz or platinum, at a temperature in the range of 1450° C. to 1600° C., preferably 1560° C.–1600° C., in the presence of a reducing agent for the cerium. The reducing agent may be selected from known compounds used for this purpose, such as: carbon monoxide, carbon, arsenic trioxide ($As_2O_3$), sugar, salt, etc. Generally, the amount of the reducing agent will be in the range of between 0.05% to 5% by weight.

In a particularly preferred embodiment of the invention, the reducing agent added to the batch will be silicon monoxide, SiO. This results in the reduction of the ceric ion according to the reaction:

$$2CeO_2+SiO \rightarrow Ce_2O_3+SiO_2$$

The reducing agent is thus converted to the main glass-forming compound $SiO_2$, leaving no residue or additional dopant.

SiO is introduced into the glass batch in an amount corresponding to the molar ratio

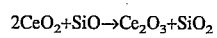

Preferably, the molar ratio $SiO/CeO_2$ is from 1 to 3.

If the molar ratio is greater than 4, unreacted SiO remains in the glass, causing undesirable crystallization and black coloring. If the molar ratio is less than 0.5, non-reduced $Cd^{4+}$ remains in the glass, causing undesirable coloring (yellow to brown) and a deterioration of transparency.

The use of silicon monoxide is disclosed in Soviet Union Patent No. 874,686 in the manufacture of lead-containing ruby glass. The SiO apparently does not act as a reducing agent in the melt, but regulates the induction of color upon heat treating the solid glass.

There are four main glass matrices which will be used in the invention:

1. $SiO_2$—$B_2O_3$—BaO—$Na_2O$.
2. $SiO_2$—$Al_2O_3$—ZnO—$Na_2O$.

3. $SiO_2$—$Al_2O_3$CaO—MgO—$Na_2O$.

4. $SiO_2$—$Al_2O_3$ZnO—CaO—MgO—$Na_2O$.

The particular matrix selected depends on the envisaged use of the glass according to the invention. When the glass is to be used as a scintillating detector, the matrices to be used are:

(a) $SiO_2$—$B_2O_3$—BaO—$Na_2O$, or (b) $SiO_2$—$Al_2O_3$—ZnO—$Na_2O$

The amount of the components in these matrices should be in the following ranges (weight percent):

| (a) | | (b) | |
|---|---|---|---|
| $SiO_2$: | 64–72; | $SiO_2$: | 64–75 |
| $B_2O_3$: | 10–12; | $Al_2O_3$: | 0.5–3 |
| BaO: | 1–4; | ZnO: | 10.5–13 |
| $Na_2O$: | 10.1–12; | $Na_2O$: | 10.1–16 |

When the glass is intended to be used in a neutron radiation detector, the boron oxide will be incorporated via its isotope ($B^{10}$ oxide). The glasses with the above compositions, containing an amount of cerium in its reduced form between 0.5% to 15% by weight were found to possess the property of decreasing the emission time to the range of 25 nanoseconds or even 7 nanoseconds according to the specific requirement. This can be achieved by changing the threshold of sensitivity of the highly sensitive receiver to 50% of the maximum intensity of the signal.

When the glasses are used for absorbing UV rays having a wavelength of below 340 nm and should possess high transparency at wavelengths above 370 nm, the matrices to be used can be as follows:

(c) $SiO_2$—$Al_2O_3$—CaO—MgO—$Na_2O$ (d) $SiO_2$—$Al_2O_3$—ZnO—CaO—MgO—$Na_2O$

The amounts of the components in these matrices, should be in the following ranges (weight percentages):

| (c) | | (d) | |
|---|---|---|---|
| $SiO_2$: | 70–75 | $SiO_2$: | 68–72 |
| $Al_2O_3$: | 1–3 | $Al_2O_3$: | 1–3 |
| CaO: | 8–10 | ZnO: | 1–3 |
| MgO: | 1–3 | CaO: | 6–9 |
| $Na_2O$: | 13–16 | MgO: | 1–3 |
| | | $Na_2O$: | 10.1–16 |

These glasses, in view of their particular properties, will be most useful for greenhouse roofing panels and building windows. Even a glass of a thickness of only 2 mm will absorb UV rays. Other uses for such glasses are for X-ray imaging instruments and lenses for eyeglasses. They will be most useful as filter glass, i.e. optical glass elements that are partially or fully absorbent of electromagnetic radiation in the ultraviolet region of the electromagnetic spectrum. The specific filter composition can be routinely designed in order to fit the absorbance desired.

In most of the cases, the glasses according to the invention do not require additional colorants since the cerium oxide itself will provide a satisfactory color. However, when a more intense color is required, conventional colorants may also be added.

Preferably, the glass of the invention is formed by making a mixture of matrix components, and a separate mixture of $CeO_2$ and reducing agents. The two separate mixtures are then combined and melted.

In the following Table 1, decay time data is given obtained with various cerium contents in the glass according to the invention.

TABLE 1

Decay time of glasses according to the Invention

| Composition | Ce Doping content weight (%) | emission wavelength (nm) | radiative lifetime (ns) |
|---|---|---|---|
| $SiO_2$—$B_2O_3$—BaO—$Na_2O$—$K_2O$ | 0.5 | 420 | 44 |
| | 10 | 420 | 37 |
| | 15 | 420 | 43 |

While the invention will hereinafter be illustrated by Examples, it should be understood that these are presented only for a better understanding of the invention, without limiting its scope. In the Examples, the amounts of the constituents are given in weight percentages, unless otherwise stated.

EXAMPLE 1

A batch of glass was prepared by mixing the following constituents:

$SiO_2$: 72%; $Al_2O_3$: 2%; ZnO: 11%; and $Na_2O$: 15%, with 3% cerium oxide and 0.8% activated carbon as reducing agents.

All the above oxides were reagent grade of a high purity.

The mixture was melted in a conventional vessel, at a temperature in the range of between 1500° and 1560° C.

The properties of the resultant glass were as follows:

decay time: less than 44 ns.

transmission: 0% at 350 nm, and 90% at 400 nm (without reflectance).

The above improved properties were achieved by the combination of the UV transparent matrix with the cerium oxide in its reduced form, as dopant, which imparts the UV absorbing property.

EXAMPLE 1a

Example 1 was repeated, but the activated carbon was replaced by 2.7% SiO to obtain an equivalent glass.

EXAMPLE 1b

Example 1 was repeated with 10% $CeO_2$ and 3.84% SiO as reducing agent, replacing the activated carbon.

EXAMPLE 2

A batch of glass was prepared by mixing the following constituents:

$SiO_2$: 69%; $B_2O_3$: 11%; BaO: 2.8% $Na_2O$: 10.4%; and $K_2O$: 6.5%;

Cerium oxide: 0.5% was added as a dopant, mixed with 0.3% $As_2O_3$ and 0.128% SiO, to maintain reducing conditions.

The glass was further prepared as in Example 1, its properties being as follows:

decay time: less than 44 ns.

transmission: 92% at 400 nm.

maximum luminescence: 420 nm.

The glass obtained was suitable for use in detectors based on the low decay time of luminescence and high transparency in the region of luminescence, i.e. scintillating detectors for ionizing radiation and high-energy particles streams.

EXAMPLE 2a

Glass was prepared as in Example 2, but with 5% $CeO_2$ and 1.28% SiO.

EXAMPLE 3

Glass was prepared as in Example 2, using the following constituents:

$SiO_2$: 72.5%; $Al_2O_3$: 1.8%; CaO: 8.0% MgO: 2.0%; $Na_2O$: 14%; SiO: 0.15% $K_2O$: 1.7%; and 1.2% cerium oxide.

The glass obtained was suitable for use in a greenhouse as roofing panels for protection against harmful UV rays with a wavelength below 340 nm.

EXAMPLE 3a

Example 3 was repeated, but with 2.5% $CeO_2$ and 0.64% SiO.

The highly advantageous properties of the glasses according to the invention are illustrated in FIGS. 1–4.

In FIG. 1, the transmittance of glass according to the present invention (composition of Example 1), having a thickness of 2 mm, is illustrated by correlating the percent transmission versus wavelength in nm. A transmission of 85% is achieved for radiation with a wavelength above 385 nm, and 92% for radiation with a wavelength above 400 nm.

Figure 2:
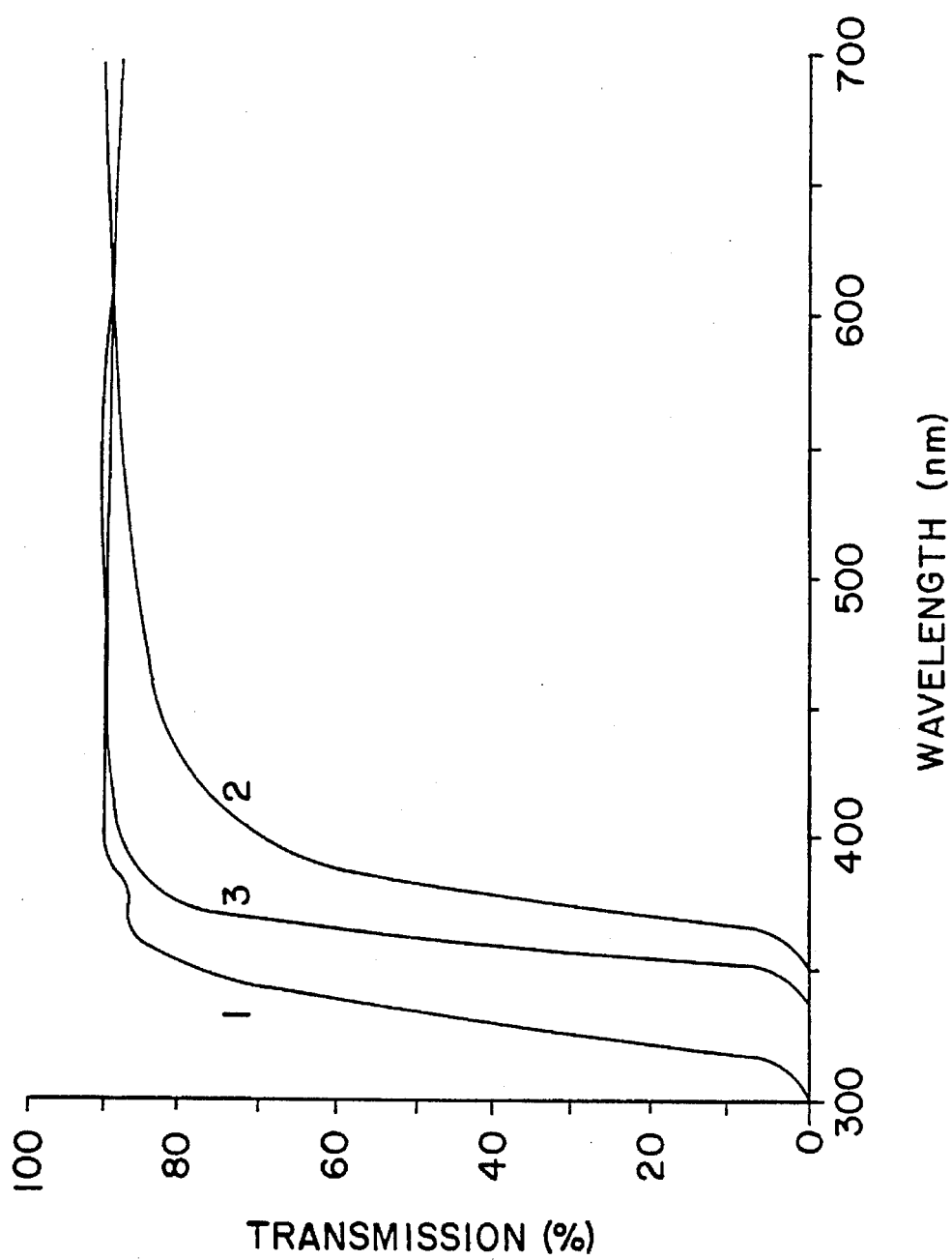
FIG. 2 is a graph of transmission percentage of a glass according to the present invention (3) as a function of wavelength, compared with regular window glass (1) and a known UV absorption glass (2)

In FIG. 2, the transmittance of the glass according to the present invention (3) (composition of Example 3) is compared with a known absorbing ultraviolet glass (2) and a regular window glass (1). The differences in the wavelength of the absorbed radiation appear in a clear manner from the graphs.

Figure 3:
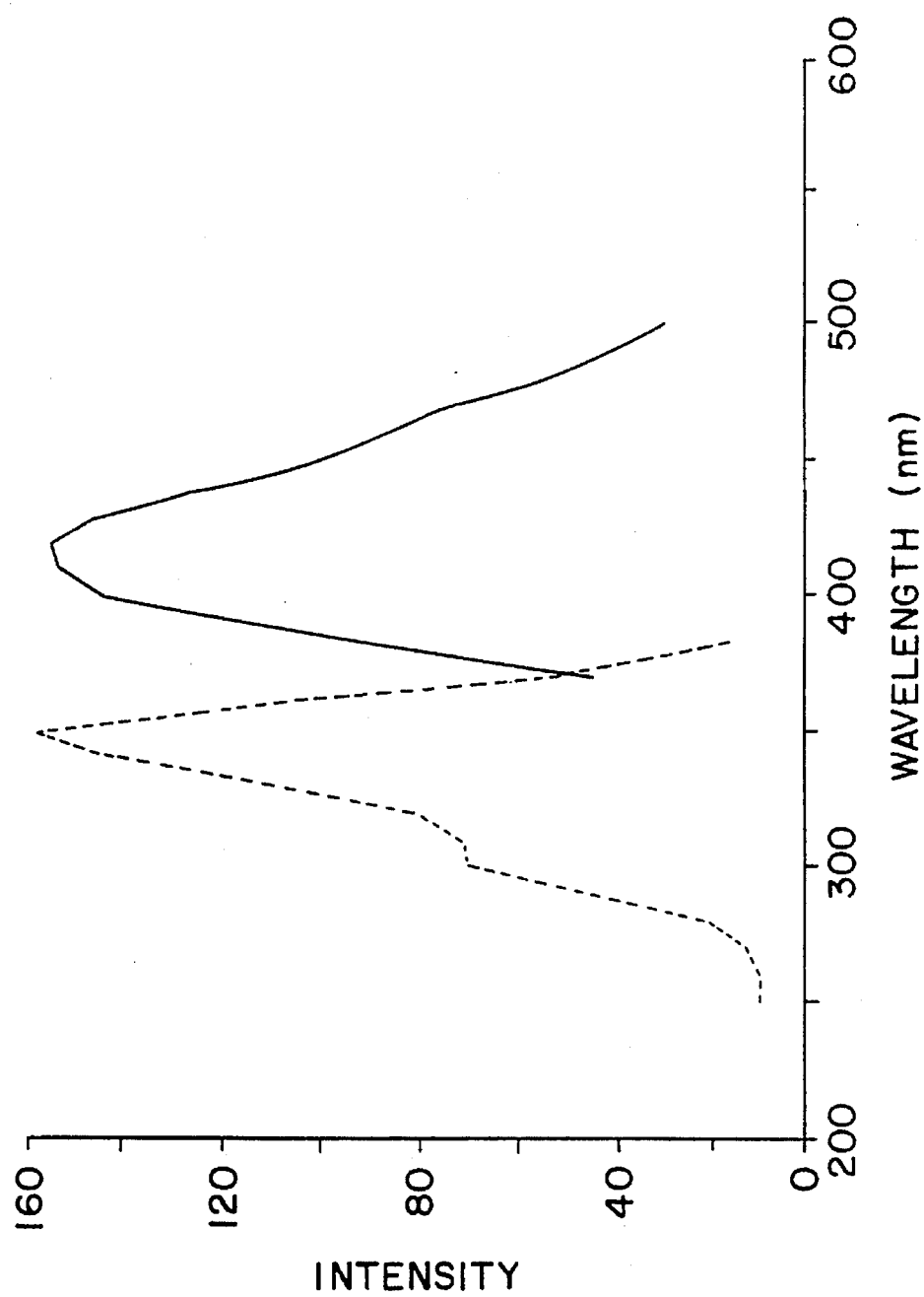
FIG. 3 is a graph of excitation (dashed line) and emission (solid line) spectra of a glass sample according to the present invention vs. wavelength.

In FIG. 3, the luminescence of the cerium dopant in the glass according to the present invention (composition of Example 2) is shown by its regions of excitation, in dashed line, and emission, in solid line. The emitted light has a maximum intensity at 420 nm.

Figure 4:
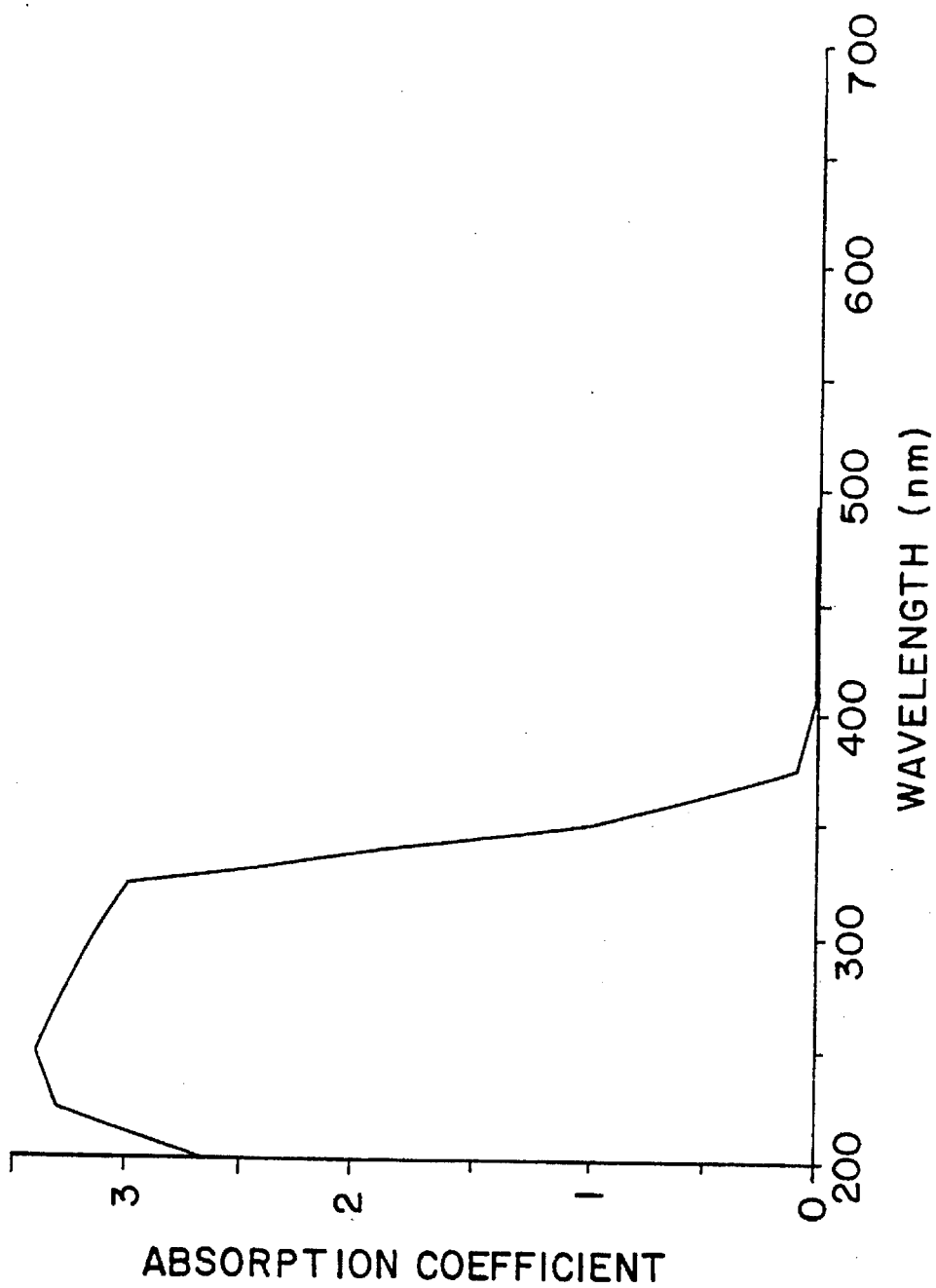
FIG. 4 is a graph of absorption coefficient as a function of wavelength, for a sample of a glass sample according to the invention.

In FIG. 4, it can be seen that in the luminescence region the glass of the invention (composition of Example 2) has very low absorption, e.g. high transparency. Comparing the region where the cerium is luminescing, at about 400 nm, the absorption of the glass according to the present invention is very low. This will be most useful for signal transfer and transparency for UV at 370–390 nm.

What is claimed is:

1. Lithium-free glass composition consisting essentially of, by weight,:

64% to 75% $SiO_2$ as a matrix compound;

11% to 16% total of at least one additional matrix compound selected from the group consisting of $B_2O_3$ and BaO, or at least one additional matrix compound selected from the group consisting of $Al_2O_3$, MgO, CaO and ZnO;

above 10% $Na_2O$ first modifier compound;

0–7% $K_2O$ as a second modifier compound;

optionally, at least one third modifier compound selected from the group consisting of MgO, CaO and ZnO and 0.1 to 15% $Ce_2O_3$ as dopant.

2. Lithium-free glass composition according to claim 1, comprising wherein the matrix compounds are selected from the group consisting of:

$SiO_2$—$B_2O_3$—BaO—$Na_2O$;
   $SiO_2$—$Al_2O_3$—ZnO—$Na_2O$;
   $SiO_2$—$Al_2O_3$—CaO—MgO—$Na_2O$; and
   $SiO_2$—$Al_2O_3$—ZnO—CaO—MgO—$Na_2O$.

3. Lithium-free glass composition according to claim 1, wherein the matrix compounds are selected from the group consisting of:

(a) $SiO_2$—$B_2O_3$—BaO—$Na_2O$; and
   (b) $SiO_2$—$Al_2O_3$—ZnO—$Na_2O$.

4. Lithium-free glass composition according to claim 3, wherein the matrix compound consist essentially of, by weight:

| (a) | | | (b) | | |
|---|---|---|---|---|---|
| $SiO_2$: | 65%–70% | | $SiO_2$: | 68%–72% |
| $B_2O_3$: | 10%–12% | | $Al_2O_3$: | 1%–2% |
| BaO: | 2%–3% | | ZnO: | 11%–13% |
| $K_2O$: | 5–7% | | $Na_2O$: | 13%–15% |
| $Na_2O$: | 10.1%–12%; or | | | |

5. Lithium-free glass composition according to claim 3 or 4, wherein the $B_2O_3$ comprises a boron isotope $B_2^{10}O_3$.

6. Lithium-free glass composition according to claim 1, which absorbs ultraviolet rays having a wavelength of below 350 nm and has a high transparency at a wavelength above 370 nm, wherein the matrix compounds are selected from the group consisting of:

(c) $SiO_2$—CaO—MgO—$Na_2O$; and
   (d) $SiO_2$—ZnO—CaO—MgO—$Na_2O$.

7. Lithium-free glass composition according to claim 6, wherein the matrix compounds consist essentially of, by weight:

| (c) | | (d) | |
|---|---|---|---|
| $SiO_2$: | 71%–73%; | $SiO_2$: | 68%–70% |
| $Al_2O_3$: | 1%–3%; | $Al_2O_3$: | 1%–3% |
| CaO: | 8%–10%; | ZnO: | 1%–3% |
| MgO: | 1%–3% | CaO: | 6%–9% |
| $Na_2O$: | 14%–15%; or | MgO: | 1%–3% |
| | | $Na_2O$: | 10.1%–13%. |

8. Lithium-free glass composition according to claim 1, which is colorless.

9. Lithium-free glass composition comprising, by weight,:

64% to 75% $SiO_2$ as a matrix compound;

11% to 16% total of at least one additional matrix compound selected from the group consisting of $B_2O_3$ and BaO, or at least one additional matrix compound selected from the group consisting of $Al_2O_3$, MgO, CaO and ZnO;

above 10% $Na_2O$ as a first modifier compound;

0–7% $K_2O$ as a second modifier compound;

optionally, at least one third modifier compound selected from the group consisting of MgO, CaO and ZnO and 0.1 to 15% $Ce_2O_3$ as dopant, said glass having the properties of high transmittance of radiation of wavelength greater than 370 mµ, substantially complete absorbance of radiation of wavelength below 350 mµ, and detection of ultraviolet and ionizing radiation with a decay time of luminescence of below 45 nanoseconds.

10. A method for preparing a lithium-free glass composition, comprising the steps of:

a) mixing together components comprising, by weight:

64% to 75% $SiO_2$ as a matrix compound;

11% to 16% total of at least one additional matrix compound selected from the group consisting of $B_2O_3$ and BaO, or at least one additional matrix compound selected from the group consisting of $Al_2O_3$, MgO, CaO and ZnO;

above 10% $Na_2O$ as a first modifier compound;

0–7% $K_2O$ as a second modifier compound;

optionally, at least one third modifier compound selected from the group consisting of MgO, CaO and ZnO and 0.1 to 15% $Ce_2O_3$ as dopant;

b) melting together the matrix compounds, modifier compounds and dopant at 1450°–1600° C. in the presence of SiO as a reducing agent; and c) solidifying the melt.

11. A method according to claim 10, wherein the SiO is present in a molar ratio of $4 > SiO/CeO_2 > 0.5$.

12. A method according to claim 11, wherein the molar ratio is $3 > SiO/CeO_2 > 1$.

13. A method according to claim 10, wherein the reducing agent is present in an amount of 0.5 to 5%, by weight.

14. A method according to claim 10, wherein a mixture of $CeO_2$ and reducing agent is added to said matrix components prior to melting.

15. A method for preparing a glass containing $Ce^{+3}$, comprising forming a melt of glass-forming components including a $Ce^{+4}$ compound, including in the melt SiO as a reducing agent, and simultaneously oxidizing SiO in the melt to $SiO_2$ and reducing the $Ce^{+4}$ to $Ce^{+3}$.

16. The method of claim 15, wherein the $Ce^{+4}$ compound is $CeO_2$ present with SiO in a molar ratio $4 > SiO/CeO_2 > 0.5$.

* * * * *